US010674657B2

(12) United States Patent
DeChristopher et al.

(10) Patent No.: US 10,674,657 B2
(45) Date of Patent: Jun. 9, 2020

(54) DIRECT SHAFT CONNECTED DUAL CENTER KNIFE DRIVE FOR AN AGRICULTURAL HARVESTER

(71) Applicant: CNH Industrial America LLC, New Holland, PA (US)

(72) Inventors: David DeChristopher, Ephrata, PA (US); Joel Cook, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 128 days.

(21) Appl. No.: 15/799,060

(22) Filed: Oct. 31, 2017

(65) Prior Publication Data

US 2019/0124830 A1   May 2, 2019

(51) Int. Cl.
| | |
|---|---|
| A01D 43/00 | (2006.01) |
| A01D 34/14 | (2006.01) |
| A01D 41/14 | (2006.01) |
| A01D 34/30 | (2006.01) |
| A01D 34/42 | (2006.01) |

(Continued)

(52) U.S. Cl.
CPC ........... *A01D 34/145* (2013.01); *A01D 34/30* (2013.01); *A01D 34/42* (2013.01); *A01D 34/44* (2013.01); *A01D 41/142* (2013.01); *A01D 69/06* (2013.01)

(58) Field of Classification Search
USPC .................................. 56/158, 257, 259, 260
See application file for complete search history.

(56) References Cited

U.S. PATENT DOCUMENTS

| | | | | |
|---|---|---|---|---|
| 1,598,843 A | * | 9/1926 | Bauercamper | ......... A01D 34/04 |
| | | | | 56/16.2 |
| 3,074,221 A | | 1/1963 | Martins | |

(Continued)

FOREIGN PATENT DOCUMENTS

| | | |
|---|---|---|
| DE | 102015106087 A1 | 10/2016 |
| EP | 2921041 A1 | 9/2015 |

(Continued)

OTHER PUBLICATIONS

International Search Report and Written Opinion for Application No. PCT/US2018/058578 dated Jan. 29, 2019 (11 pages).

(Continued)

*Primary Examiner* — Thomas B Will
*Assistant Examiner* — Mai T Nguyen
(74) *Attorney, Agent, or Firm* — Peter Zacharias; Patrick Sheldrake (57) ABSTRACT

A header for an agricultural harvester including an epicyclical drive gear train operatively connected to a first cutter bar, an epicyclical driven gear train operatively connected to a second cutter bar, and a shaft extending between and operatively connected to the epicyclical drive gear train and the epicyclical driven gear train. The epicyclical drive gear train rotates in a first direction and the shaft is configured to rotate the epicyclical driven gear train in a second direction opposite the first direction or in the same direction as the first direction. Each of the epicyclical drive gear train and epicyclical driven gear train includes a bevel gear for operatively engaging bevel gears on the shaft. Operation of the epicyclical drive gear train and epicyclical driven gear train results in substantially linear oscillating motion of the cutter bars.

31 Claims, 7 Drawing Sheets

(51) Int. Cl.
*A01D 34/44* (2006.01)
*A01D 69/06* (2006.01)

(56) References Cited

U.S. PATENT DOCUMENTS

| | | | | |
|---|---|---|---|---|
| 3,388,539 | A | * | 6/1968 | Novak .................. A01D 34/13 56/257 |
| 3,577,716 | A | * | 5/1971 | McCarty .............. A01D 34/135 56/259 |
| 3,763,638 | A | | 10/1973 | Vogelenzang |
| 3,813,859 | A | * | 6/1974 | Fuller .................... A01D 34/04 56/260 |
| 3,896,610 | A | * | 7/1975 | Hiniker .................. A01D 34/30 56/15.8 |
| 4,067,179 | A | * | 1/1978 | Schneider ............. A01D 34/30 56/297 |
| 4,198,803 | A | | 4/1980 | Quick et al. |
| 4,342,187 | A | * | 8/1982 | Shupert ................ A01D 34/30 56/257 |
| 4,446,683 | A | | 5/1984 | Rempel et al. |
| 4,866,921 | A | * | 9/1989 | Nagashima ........... A01D 34/30 56/257 |
| 5,463,857 | A | | 11/1995 | Blosser |
| 5,497,605 | A | * | 3/1996 | Underwood .......... A01D 34/30 56/14.6 |
| 6,314,707 | B1 | | 11/2001 | Ryan |
| 6,889,492 | B1 | | 5/2005 | Polk et al. |
| 7,159,378 | B2 | | 1/2007 | Rickert |
| 7,658,059 | B2 | | 2/2010 | Majkrzak |
| 7,730,709 | B2 | | 6/2010 | Priepke |
| 7,788,891 | B2 | | 9/2010 | Puryk et al. |
| 7,802,417 | B2 | * | 9/2010 | Sauerwein ............. A01D 41/14 56/181 |
| 7,921,627 | B2 | | 4/2011 | Sauerwein et al. |
| 8,011,272 | B1 | * | 9/2011 | Bich .................... A01D 34/305 56/299 |
| 8,151,547 | B2 | | 4/2012 | Bich et al. |
| 8,973,345 | B2 | * | 3/2015 | Brimeyer ............... A01D 34/30 56/257 |
| 2009/0145097 | A1 | | 6/2009 | Priepke |
| 2011/0078989 | A1 | | 4/2011 | Bich et al. |
| 2014/0345239 | A1 | * | 11/2014 | Cook .................... A01D 34/145 56/10.1 |
| 2015/0305233 | A1 | | 10/2015 | Surmann et al. |

FOREIGN PATENT DOCUMENTS

| | | |
|---|---|---|
| EP | 3090615 A1 | 11/2016 |
| EP | 3167701 A1 | 5/2017 |
| WO | 2012166666 A1 | 12/2012 |
| WO | 2014182926 A1 | 11/2014 |

OTHER PUBLICATIONS

Extended European Search Report dated Feb. 15, 2019 in European Application No. 18203213.6.

* cited by examiner

DIRECT SHAFT CONNECTED DUAL CENTER KNIFE DRIVE FOR AN AGRICULTURAL HARVESTER

The exemplary embodiments of present invention relate generally to a header of a plant cutting machine (e.g., a combine harvester) and, more specifically, to a header having an epicyclical drive directly connected to and driving a cutter bar.

BACKGROUND OF THE DISCLOSURE

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar, for severing the plants or crops via, for example, an elongate sickle mechanism that reciprocates sidewardly relative to a non-reciprocating guard structure. After crops are cut, they are collected inside the header and transported via a conveyor such as a draper belt towards a feederhouse located centrally of the header.

Epicyclical cutter bar knife drives oscillate first and second sickle mechanisms of cutter bars in opposite directions in order to cut crop. However, conventional epicyclical knife drives are disposed in a substantially horizontal orientation with substantially vertical output shafts that engage the sickle mechanism. As such, they are prone to accumulation of dirt and debris which leads to degradation of seals and premature wear of gears and other components. Moreover, conventional centrally mounted epicyclical knife drives are significantly spaced from an infeed conveyor due to their construction and orientation, which results in less efficient conveyance of cut crop to the feederhouse due to loss of crop between the knife drive and the infeed conveyor or crop stalling. In addition, due to the configuration and assembly of such epicyclical drives on a header, they generate moments or other forces that can lead to stresses in the knife drives as well as at the connections of the driver elements to the cutter bars.

BRIEF SUMMARY OF THE DISCLOSURE

The subject disclosure provides a header having an epicyclical knife drive connected directly to the cutter bar, e.g., without driver elements or other intervening structure.

In accordance with an exemplary embodiment, there is provided a header for an agricultural harvester comprising an epicyclical drive gear train operatively connected to a first cutter bar, an epicyclical driven gear train operatively connected to a second cutter bar, and a shaft extending between and operatively connected to the epicyclical drive gear train and the epicyclical driven gear train. The epicyclical drive gear train rotates in a first direction and the shaft is configured to rotate the epicyclical driven gear train in a second direction opposite the first direction or in the same direction as the first direction. The shaft engages a rear end and a medial side of the epicyclical drive gear train and the epicyclical driven gear train. The shaft includes a first end having a first bevel gear and a second end having a second bevel gear. Each of the epicyclical drive gear train and epicyclical driven gear train includes a bevel gear for operatively engaging the shaft.

An aspect of the exemplary embodiment is that the header further includes a frame and an infeed conveyor supported by the frame. The infeed conveyor has a forward end adjacent the epicyclical drive gear train, the epicyclical driven gear train, and the shaft. The shaft extends parallel or substantially parallel to the forward end of the infeed conveyor and has a width or substantially a width of the infeed conveyor.

Another aspect of the exemplary embodiment is that the header further comprises a shaft housing covering the shaft. Each of the epicyclical drive gear train and epicyclical driven gear train is housed within a housing coextensive with the shaft housing.

Another aspect of the exemplary embodiment is that each of the epicyclical drive gear train and the epicyclical driven gear train rotate about an axis perpendicular to or substantially transverse to a longitudinal axis of the first and second cutter bars. Each of the epicyclical drive gear train and the epicyclical driven gear train includes an anteriorly facing output shaft for engagement with respective first and second cutter bars.

Another aspect of the exemplary embodiment is that the header further comprises a drive mechanism driving rotation of the epicyclical drive gear train. The drive mechanism is a motor, a drive shaft or a powered drive shaft. The drive mechanism is positioned about a lateral side of the epicyclical drive gear train. The drive mechanism operatively engages a lateral side of the epicyclical drive gear train or a rear end of the epicyclical drive gear train.

Another aspect of the exemplary embodiment is that the header further comprises a frame and an infeed conveyor supported by the frame. The infeed conveyor has lateral ends each adjacent one of the epicyclical drive gear train and the epicyclical driven gear train. The epicyclical drive gear train is adjacent a forward first lateral end of the infeed conveyor and the epicyclical driven gear train is adjacent a forward second lateral end of the infeed conveyor.

In accordance with the exemplary embodiments, there is provided an epicyclical knife drive output shaft that is directly connected to the cutter bar. When the subject disclosure is used in combination with an agricultural harvester, the disclosure overcomes one more of the disadvantages referenced above by providing a header having an epicyclical knife drive connected directly to the elongate cutter bar, thereby eliminating intervening structure between the knife drive and the cutter bar and stresses associated with such structure. In addition, the assembly has less mass and is lighter in weight which is advantageous because the combine requires less energy to lift the header and there is less mass to float on the ground thereby reducing the likelihood of the cutter bars digging into the ground during operation.

In addition, the reduced depth of the housing in the front-to-rear direction allows the infeed draper conveyor belt to be moved closer to the cutter bars than in conventional headers equipped with center knife drives which results in more efficient conveyance of cut crop to the feederhouse due to reduced losses of crop between the knife drive and the infeed conveyor.

Other features and advantages of the subject disclosure will be apparent from the following more detail description of the exemplary embodiments.

BRIEF DESCRIPTION OF THE SEVERAL VIEWS OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DISCLOSURE

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Figure 1:
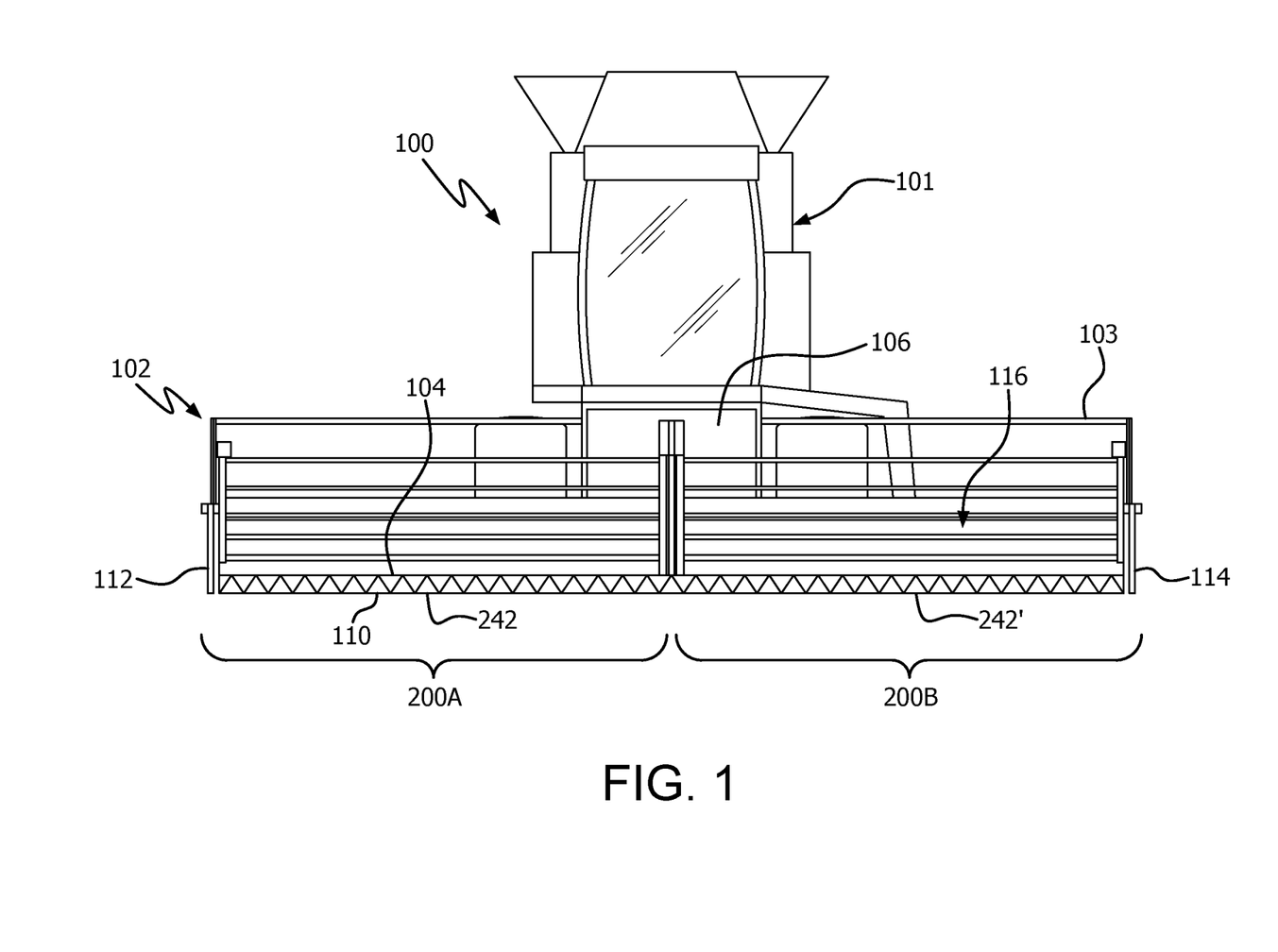
FIG. 1 is a front elevation view of an agricultural harvester including a header in accordance with an exemplary embodiment of the subject disclosure.

Referring now to the drawings, FIG. 1 illustrates an agricultural harvester 100 in accordance with an exemplary embodiment of the present disclosure. For exemplary purposes only, the agricultural harvester is illustrated as a combine harvester. The harvester 100 includes a header 102 attached to a forward end of the harvester, which is configured to cut crops, including (without limitation) small grains (e.g., wheat, soybeans, grain, etc.), and to induct the cut crops into a feederhouse 106 as the harvester moves forward over a crop field.

The header 102 includes a frame 103 having a floor 104 that is supported in desired proximity to the surface of a crop field. First and second cutting assemblies 200A, 200B extend transversely along a forward edge of the floor 104 i.e., in a widthwise direction of the harvester. The first and second cutting assemblies 200A, 200B, described in greater detail hereinafter, are configured to cut crops in preparation for induction into the feederhouse 106. The header may include one or more draper conveyor belts for conveying cut crops to the feederhouse 106, which is configured to convey the cut crops into the harvester for threshing and cleaning as the harvester 100 moves forward over a crop field. The header 102 may include an elongated, rotatable reel 116 which extends above and in close proximity to the first and second cutting assemblies 200A, 200B. The rotatable reel 116 is configured to cooperate with the one or more draper conveyors in conveying cut crops to the feederhouse 106 for threshing and cleaning. While the foregoing aspects of the harvester are being described with respect to the header shown, the cutting assembly of the subject application can be applied to any other header having use for such a cutting assembly.

The cutting assemblies 200A, 200B extend along a forward edge 110 of the floor 104, and are generally bounded by a first side edge 112 and an opposing second side edge 114, both adjacent to the floor 104.

Figure 2:
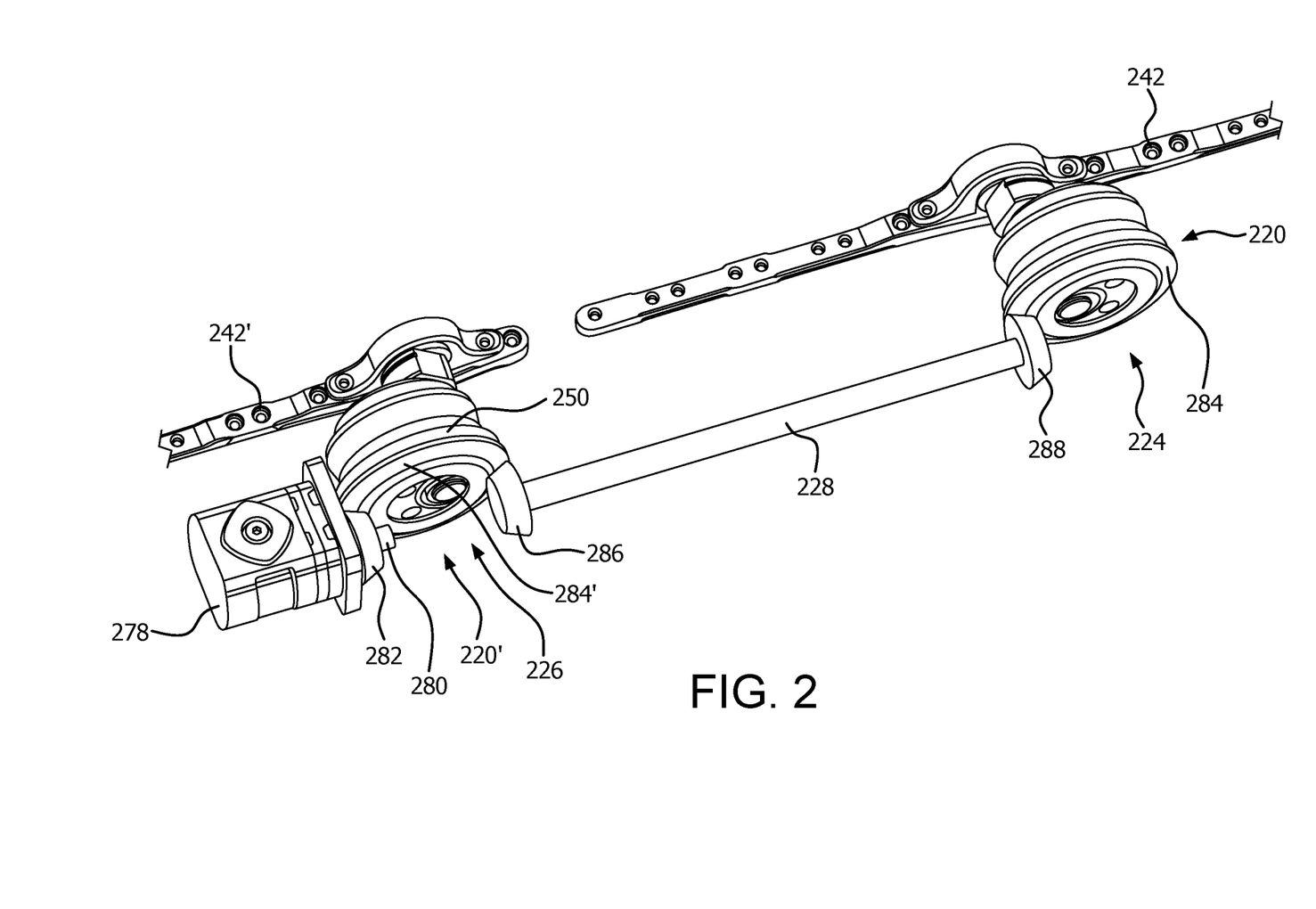
FIG. 2 is a top rear perspective view of an exemplary embodiment of a portion of a header in accordance with an exemplary embodiment of the subject disclosure with certain elements omitted for purposes of illustration.

According to an exemplary embodiment as shown in FIGS. 1 and 2, the cutting assemblies 200A, 200B include a first cutter bar 242 and a second cutter bar 242'. The cutting assemblies 200A, 200B are driven by knife drive assemblies 220, 220' that drive cutter knife heads, unillustrated in FIG. 1, in oscillating motion whereby the knife heads move laterally to the left and right. Cutter knife heads applicable to the present exemplary embodiments are disclosed, e.g., in U.S. Pat. Nos. 7,730,709 and 8,151,547, the entire disclosures of which are incorporated by reference herein in their entirety for all purposes.

Referring to FIG. 2, the knife drive assembly 220 includes a first housing 224A (FIG. 6) that houses a first epicyclical drive 224 supported by the frame 103 (FIG. 1) that converts rotational motion to oscillating motion to drive the first cutter bar 242 in a manner described in more detail below. The knife drive assembly 220' includes a second housing 226A (FIG. 6) that houses a second epicyclical drive 226 also supported by the frame 103 that converts rotational motion to oscillating motion to drive the second cutter bar 242'. Hereinafter, the first epicyclical drive 224 will be referred to as the epicyclical driven gear train and the second epicyclical drive 226 will be referred to as the epicyclical drive gear train.

A shaft 228 extends between and is operatively connected to the epicyclical driven gear train 224 and the epicyclical drive gear train 226. As illustrated in FIG. 2 and as further discussed below, the epicyclical driven gear train 224 and the epicyclical drive gear train 226 face in an anterior direction or substantially in an anterior direction of the header and are mounted generally centrally along the header frame on each side of the shaft 228.

Figure 3:
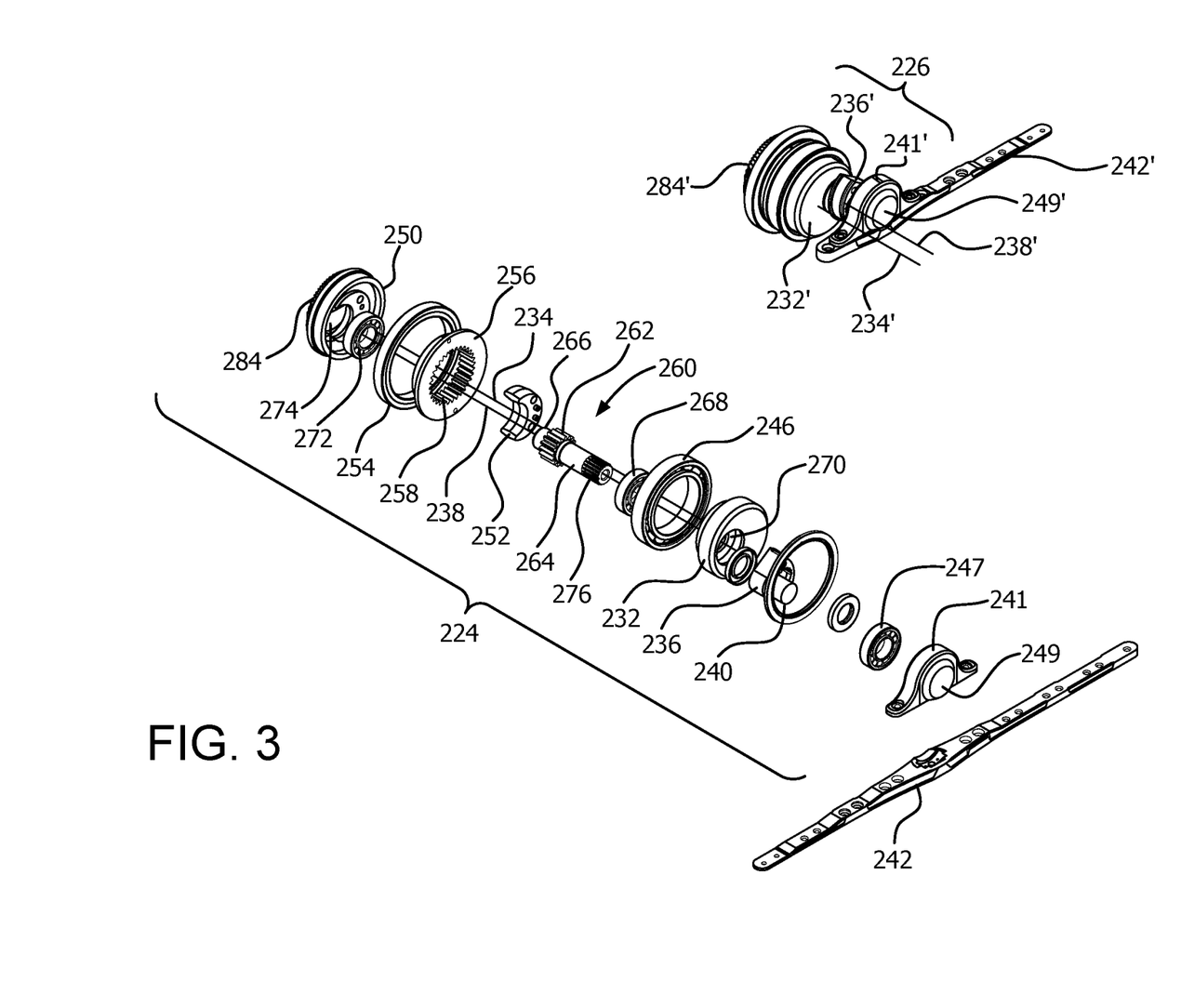
FIG. 3 is an exploded perspective view of the knife drive assembly of FIG. 2.

Referring to FIG. 3, there is shown in an exploded perspective view the epicyclical driven gear train 224 and an assembled view of the epicyclical drive gear train 226. As seen in connection with the epicyclical driven gear train 224 (wherein the epicyclical drive gear train 226 is constructed in a mirror image-like fashion), the epicyclical driven gear train includes a first rotatable wheel 232 having a first central rotational axis 234. The epicyclical driven gear train further includes a first flange or planetary member 236 having a first eccentric axis 238 rotatable about the first central rotational axis 234, and a first output shaft 240 spaced from the first eccentric axis 238. Operation of the epicyclical driven gear train results in linear oscillating or substantially linear oscillating motion of the output shaft in a direction transverse to the first central rotational axis 234.

Likewise, the epicyclical drive gear train 226 includes a second rotatable wheel 232' having a second central rotational axis 234'. The epicyclical drive gear train further includes a second flange or planetary member 236' having a second eccentric axis 238' rotatable about the second central rotational axis, and a second output shaft spaced from the second eccentric axis. The second output shaft is shrouded from view in FIG. 3 by a cover plate 249' of a pillow block 241' which, in turn, is attached to a cutter bar 242' in a manner described below. Operation of the epicyclical drive gear train results in linear oscillating or substantially linear oscillating motion of the output shaft in a direction transverse to the second central rotational axis. So constructed and arranged, the second central rotational axis 234' is parallel to and spaced from the first central rotational axis 234. In addition, the first central rotational axis of the first rotatable wheel is parallel to the first eccentric axis of the first flange and the first output shaft, and the second central rotational axis of the second rotatable wheel is parallel to the second eccentric axis of the second flange and the second output shaft.

The first rotatable wheel 232 is mounted for rotation on an outer bearing or bushing 246 which is seated in a forwardly facing opening of a first housing (not shown). The first rotatable wheel 232 is affixed for rotation to a first rear rotatable wheel 250 via a generally crescent-shaped connector 252 by fasteners such as screws, bolts, or the like. The first rear rotatable wheel 250 is mounted for rotation in a rear outer bearing or bushing 254 which is seated in the opening of the first unillustrated housing. Situated between the first rotatable wheel 232 and the first rear rotatable wheel 250 is a stationary central gear 256 having internal gear teeth 258. A shaft 260 has external gear teeth 262 adapted to matingly engage the internal gear teeth 258 of the central gear 256. Shaft 260 has portions 264, 266 that respectively rotate in a first inner bearing or bushing 268 which resides in an opening 270 in the first rotatable wheel 232 and a rear inner bearing or bushing 272 which resides in an opening 274 in the first rear rotatable wheel 250. The forward end of shaft 260 has a splined or toothed exterior 276 that is adapted to matingly engage a similarly splined or toothed interior of the first flange 236.

As the first rear rotatable wheel 250 rotates, the shaft 260 is caused to orbit about the first central rotational axis 234. As the shaft 260 orbits about the first central rotational axis 234, its gear teeth 262 engage gear teeth 258 of the stationary central gear 256 causing counter-rotation of the shaft 260 and the first flange 236 engaged thereby. As the first flange 236 rotates, the output shaft 240 carried thereby exhibits a linear oscillating or substantially linear oscillating motion in a direction transverse to the first central rotational axis 234.

Still referring to FIG. 3, the first rotatable wheel 232 is adjacent to the first cutter bar 242 and the second rotatable wheel 232' is adjacent to the second cutter bar 242'. Further, a distal end of the first output shaft 240 extends proud of the first flange 236 whereby the first output shaft engages the first cutter bar 242. Likewise, a distal end of the unillustrated second output shaft extends proud of the second flange 236' whereby the second output shaft engages the second cutter bar 242'. More particularly, as shown in FIG. 3, a pillow block 241 or similar structure is attached to a first cutter bar 242 by unillustrated fasteners, e.g., bolts or the like. Likewise, a pillow block 241' or similar structure is attached to a second cutter bar 242'. Pillow blocks 241, 241' define unillustrated openings for respectively receiving bearings or bushings, e.g., bushing 247, within which are respectively received the first flange output shaft 240 and the unillustrated second flange output shaft. In this way, the first and second cutter bars 242, 242' are directly connected to the first and second flange output shafts.

The first and second cutter bars are configured, e.g., as shown in FIG. 3. That is, the first cutter bar 242 extends in a direction transverse to the first central rotational axis 234, and the second cutter bar 242' extends in a direction transverse to the second central rotational axis 234' opposite the first cutter bar. So constructed and arranged, rotation of the epicyclical driven gear train 224 and the epicyclical drive gear train 226 causes the output shafts thereof to oscillate the first and second cutter bars 242, 242' in opposite directions and along a single plane. Consequently, at one extreme in the motion of the output shafts of the epicyclical driven gear train 224 and the epicyclical drive gear train 226 the output shafts are at a minimum transverse distance from one another and at the opposite extreme the output shafts are at a maximum transverse distance from one another for purposes of vibration cancellation. As is known, vibration causes wear and tear on the various moving components of a cutter bar knife drive assembly. The present construction essentially eliminates vibration thereby effectively reducing harmful wear and tear.

As noted above, the shaft 228 extends between and is operatively connected to the epicyclical driven gear train 224 and the epicyclical drive gear train 226. In order to achieve effective vibration cancellation, the epicyclical driven gear train 224 and the epicyclical drive gear train 226 must be timed such that the cutter bars 242, 242' have substantially exact equal and opposite motion. Shaft 228 provides a timing coupling suitable to achieve this motion. Accordingly, when connected to cutter bar knife heads in the manner described below, the output shafts of the epicyclical driven gear train 224 and the epicyclical drive gear train 226 move the cutter bars back and forth in horizontal or substantially horizontal vibration cancelling motion as the cutting knives of the cutter bars cut crop while the agricultural harvester 100 and header 102 move forwardly over a crop field.

In addition, each of the epicyclical drive gear train 226 and the epicyclical driven gear train 224 rotate about an axis perpendicular to or substantially transverse to a longitudinal axis of the first and second cutter bars 242, 242'. As a result, the output shafts of the epicyclical driven gear train 224 and the epicyclical drive gear train 226 extend perpendicular to or substantially transverse to the cutter bars 242, 242' for engagement therewith. That is, each of the epicyclical driven gear train 224 and the epicyclical drive gear train 226 includes a rotatable gear assembly having a rotational axis extending perpendicular to or substantially transverse to a longitudinal axis of the first and second cutter bars 242, 242'. In other words, the epicyclical driven gear train 224 includes an anteriorly facing or substantially anteriorly facing output shaft 240 engaged with the first cutter bar 242, and the epicyclical drive gear train 226 includes an anteriorly facing or substantially anteriorly facing output shaft engaged with the second cutter bar 242'.

Thus, the central rotational axes 234, 234' of the epicyclical driven gear train and the epicyclical drive gear train face in an anterior or substantially anterior direction whereby the first rotatable wheels 232, 232' are oriented vertically or substantially vertically, i.e., their rotational axes being horizontal or substantially horizontal. The vertical or substantially vertical orientation of the first rotatable wheels 232, 232' advantageously cause the wheels to disburse dirt and debris that strikes the wheels during operation of the agricultural harvester, thereby preventing such dirt and debris from collecting on the epicyclical driven gear train 224 and the epicyclical drive gear train 226 and causing damage to the outer and inner bearings or bushings 254, 268. Likewise, the first and second flange output shaft bearings or bushings, e.g., bushing 247, are protected from ingress of dirt and debris by the pillow block covers 249, 249' (FIG. 3).

As described in greater detail below, by virtue of the connection of the drive shaft 228 to the epicyclical driven gear train 224 and the epicyclical drive gear train 226, operational drive of the epicyclical driven gear train 224 or the epicyclical drive gear train 226 produces an oscillating motion in its respective flange output shaft as well as an identical but opposite oscillating motion in the flange output shaft of the other of the epicyclical driven gear train and the epicyclical drive gear train. In other words, one of the epicyclical driven gear train 224 and the epicyclical drive gear train 226 is driven by the other of the epicyclical driven gear train 224 and the epicyclical drive gear train 226 via the drive shaft. That is to say, the epicyclical driven gear train 224 may assume the role of the epicyclical drive gear train 226 and vice versa depending on whether a drive mechanism 278 (FIG. 2) is positioned to drive rotation of gear train 226 or gear train 224.

Movement of the several components of the epicyclical driven gear train 224 and the epicyclical drive gear train 226 may be achieved as follows. According to an aspect, a suitable driver or drive mechanism 278 such as a motor (e.g., a hydraulic or electric motor, see FIG. 2), a power take-off (PTO) shaft, belts, chains, a driven or power drive shaft or a combination of such drivers drives a drive shaft 280 (FIG. 2) extending from the drive mechanism. According to an aspect, the drive mechanism is positioned about a lateral side of the epicyclical drive gear train 226 and operatively engages a lateral side of the epicyclical drive gear train. It will be understood, however, that the drive mechanism 278 may be positioned about a lateral side of the epicyclical driven gear train 224 and operatively engage a lateral side of the epicyclical driven gear train. Drive shaft 280 is operatively connected to a rear end of one of the epicyclical driven gear train 224 and the epicyclical drive gear train 226. For instance, the drive shaft 280 includes a gear (e.g., a bevel gear) 282 operatively connected to one of the epicyclical driven gear train 224 and the epicyclical drive gear train 226 (in the illustrated example, the epicyclical drive gear train 226). Gear 282 engages a gear (e.g., a bevel gear) 284' affixed to second rear rotatable wheel 250' causing rotation thereof as well as second rotatable wheel 232'.

The shaft 228 engages a rear end and a medial side of the epicyclical driven gear train 224 and the epicyclical drive gear train 226. The shaft 228 is a driven shaft driven by one of the epicyclical driven gear train and the epicyclical drive gear train (in the illustrated example, the epicyclical drive gear train 226). A first bevel gear 286 is provided at a first end of the shaft 228 and a second bevel gear 288 is provided at a second end of the shaft 228. The first bevel gear 286 engages a third bevel gear 284' provided on the epicyclical drive gear train 226 for operatively engaging the shaft and the second bevel gear 288 engages a fourth bevel gear 284 provided on the epicyclical driven gear train 224 for operatively engaging the shaft.

In the illustrated example, drive shaft 280 is drivingly connected to gear 282, i.e., a fifth bevel gear, which drives the third bevel gear 284' carried by the epicyclical drive gear train 226. The third bevel gear 284' drives the first bevel gear 286 and thus the shaft 228 whose second bevel gear 288 drives the fourth bevel gear 284 of the epicyclical driven gear train 224. As a result, the epicyclical driven gear train 224 rotates in a direction opposite the epicyclical drive gear train 226. Furthermore, as noted above, the drive mechanism 278 may be used to drive the fourth gear 284 instead of third gear 284'.

Figure 4:
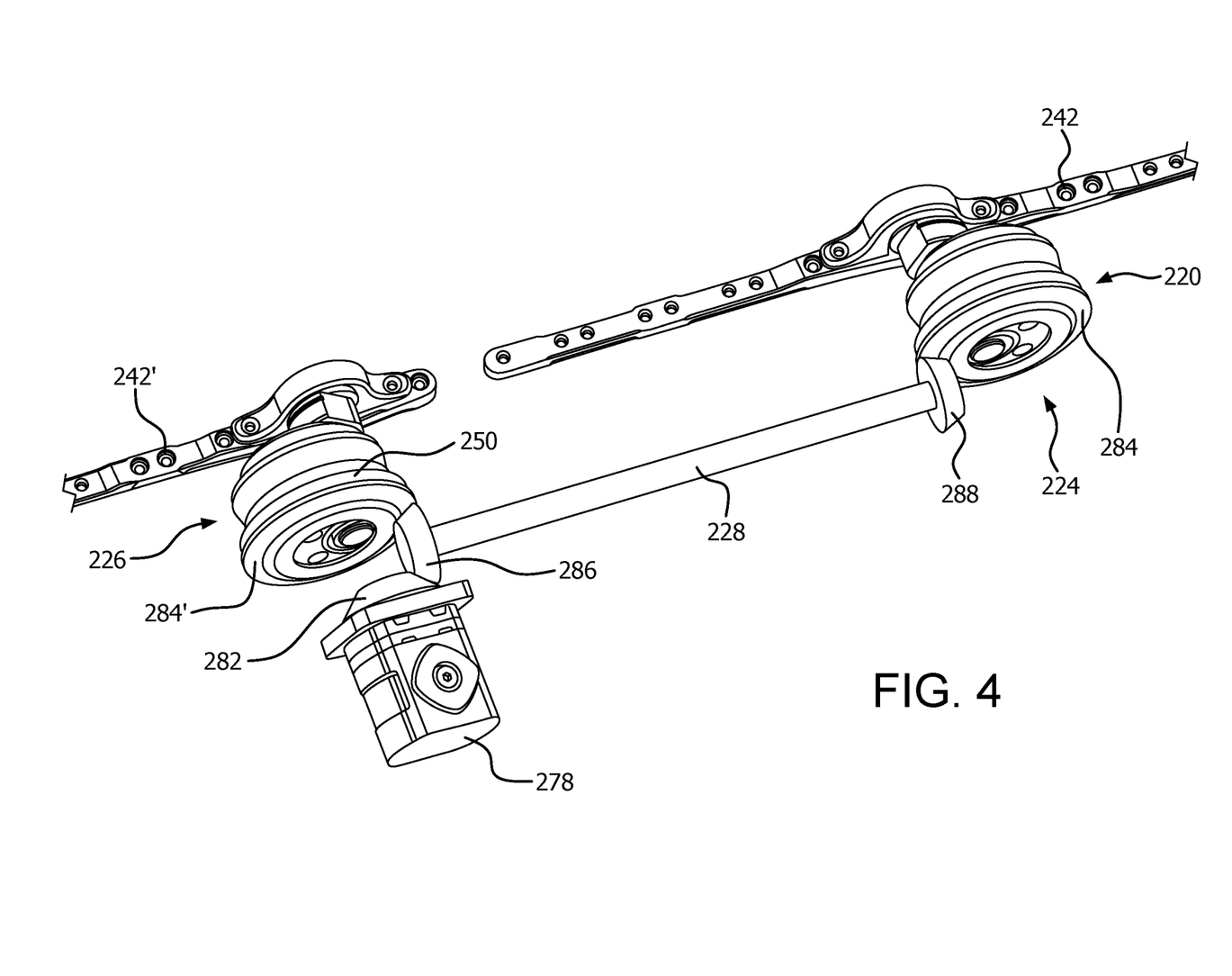
FIG. 4 is a top rear perspective view of an exemplary embodiment of a portion of a header in accordance with another exemplary embodiment of the subject disclosure with certain elements omitted for purposes of illustration.

Still further, referring to FIG. 4, the drive mechanism 278 may be disposed to directly drive rotation of the shaft 228. That is, the drive mechanism 278 may be disposed adjacent or rearwardly of and opposite to the epicyclical drive gear train 226 such that the fifth bevel gear 282 drives the first bevel gear 286 connected to the shaft 228. Alternatively, it will be understood that the drive mechanism 278 may be disposed adjacent or rearwardly of and opposite to the epicyclical driven gear train 224 such that the fifth bevel gear 282 drives the second bevel gear 288 connected to the shaft 228.

Figure 5:
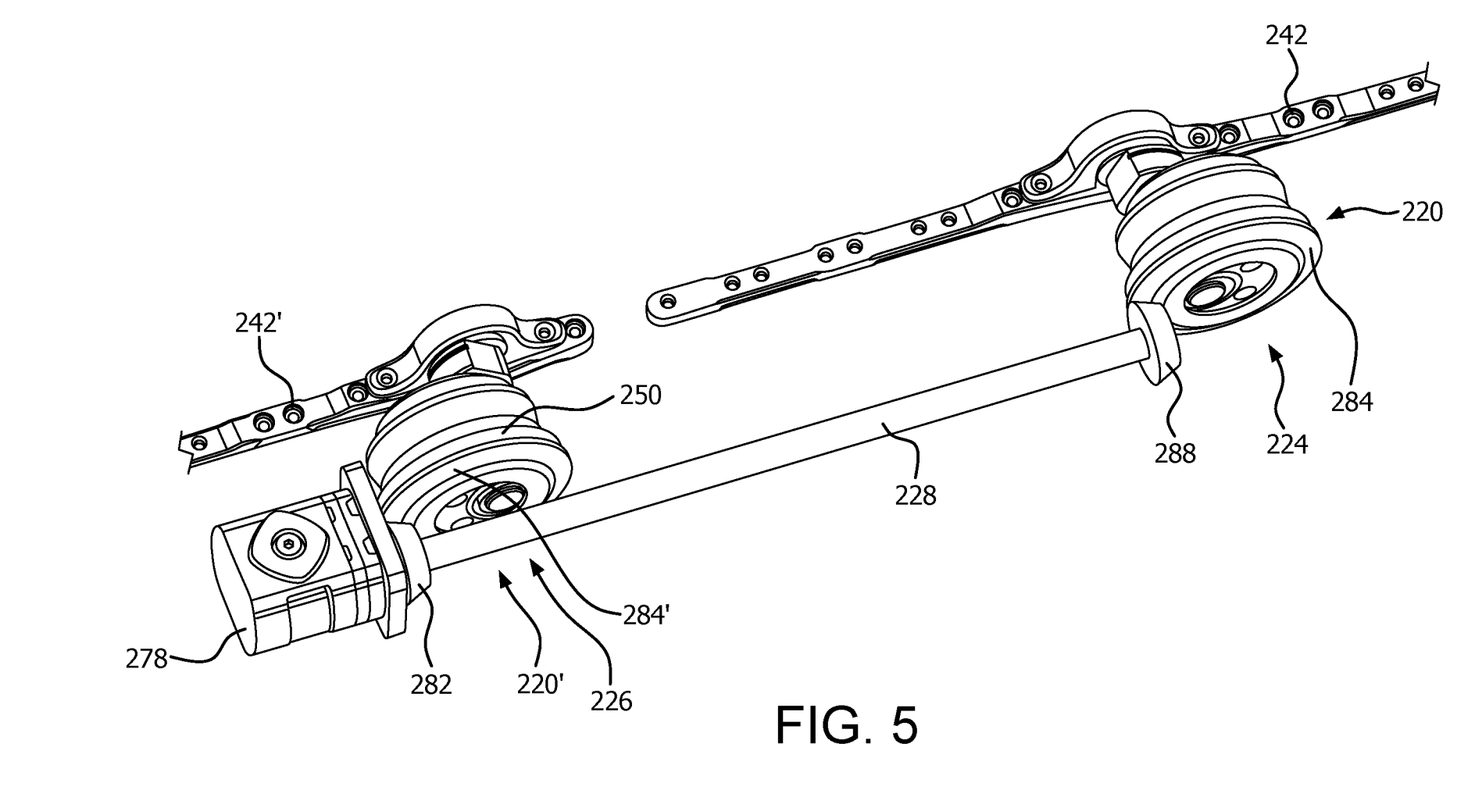
FIG. 5 is a top rear perspective view of an exemplary embodiment of a portion of a header in accordance with another exemplary embodiment of the subject disclosure with certain elements omitted for purposes of illustration.

Referring to FIG. 5, once again the drive mechanism may be disposed to directly drive rotation of the shaft 228. As illustrated, shaft 228 may be directly connected to bevel gear 282 which is driven by drive mechanism 278, thereby eliminating the need for bevel gear 286 of FIGS. 2 and 4. The result of such an arrangement is that the epicyclical drive gear train 226 and the epicyclical driven gear train 224 are driven to rotate in the same direction rather than opposite directions.

In other words, the drive mechanism 278 may drive rotation of at least one of the epicyclical driven gear train 224, the epicyclical drive gear train 226, and the shaft 228, and rotation of the at least one of the epicyclical driven gear train, the epicyclical drive gear train, and the shaft causes rotation of the others of the at least one of the epicyclical driven gear train, the epicyclical drive gear train, and the shaft.

Figure 6:
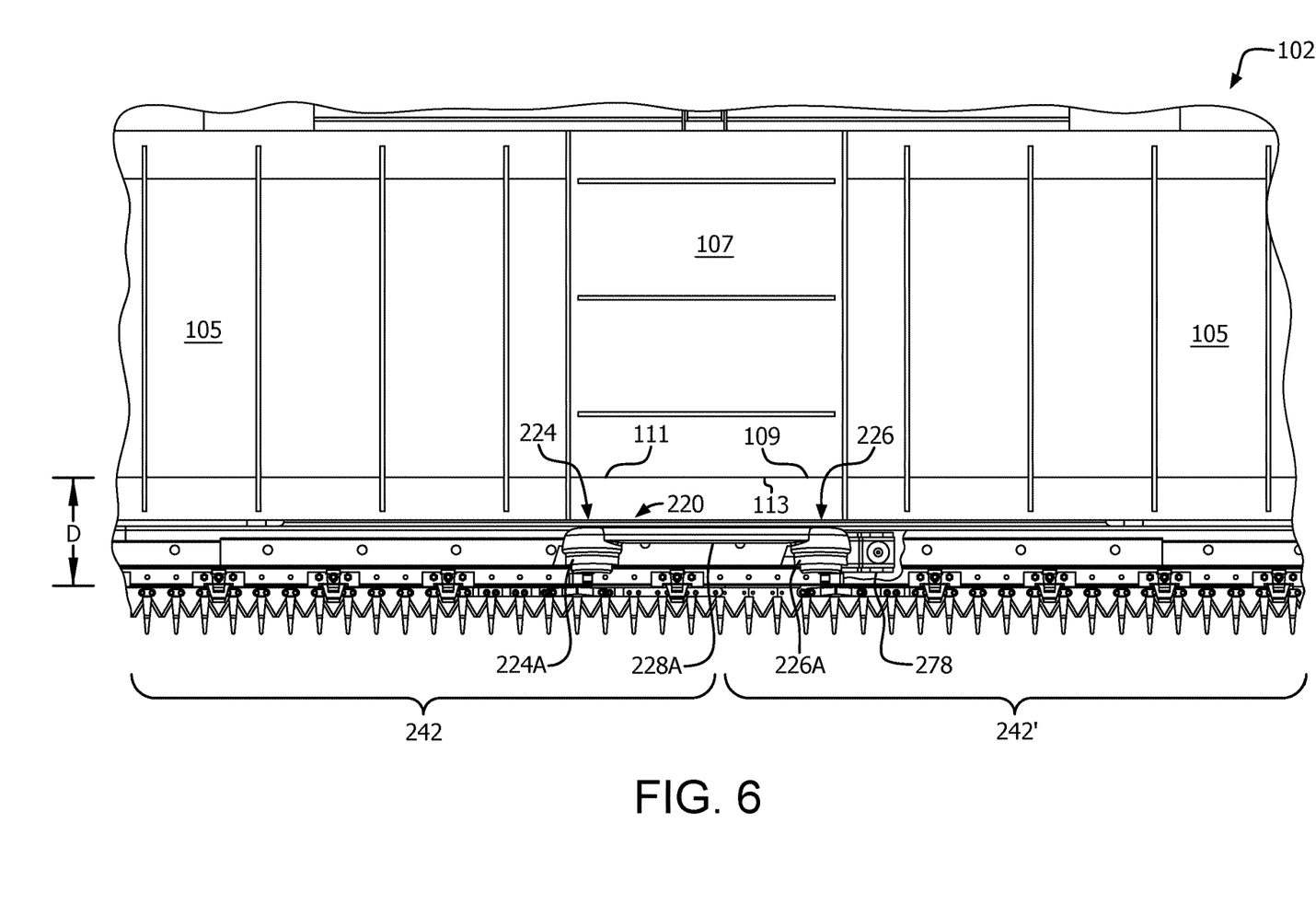
FIG. 6 is a partial top plan view of a portion of the header of FIG. 2.

Referring to FIG. 6, the header 102 includes a pair of laterally-extending draper conveyors 105 which direct crop cut by cutter bars 242, 242' to one or more (one is shown) centrally located, fore-and-aft extending infeed conveyor(s) 107 supported by the frame that direct the cut crop to the feederhouse 106 (FIG. 1). According to an aspect, a shaft housing 228A covers the drive shaft and each of the epicyclical drive gear train and epicyclical driven gear train are housed within housings 226A, 224A, respectively, that are coextensive with the shaft housing. The shaft housing 228A, epicyclical drive gear train housing 226A and epicyclical driven gear train housing 224A may be three independent housing structures. Alternatively, one or the other of the epicyclical drive gear train housing 226A and epicyclical driven gear train housing 224A may be joined to the shaft housing 228A, or all three housings may be integrally fabricated as a single housing structure. According to another aspect, the shaft extends substantially parallel to a forward end of the infeed conveyor and for a width or substantially a width of the infeed conveyor.

In addition, it is understood the shaft 228 could be constructed as a single shaft or built up of two or more shafts connected end-to-end in order to transmit motion between the first and second epicyclical drives. Similarly, the shaft could be fabricated as one piece or constructed of a through shaft inside a tube with the tube ends necking down to the through shaft.

Figure 6A:
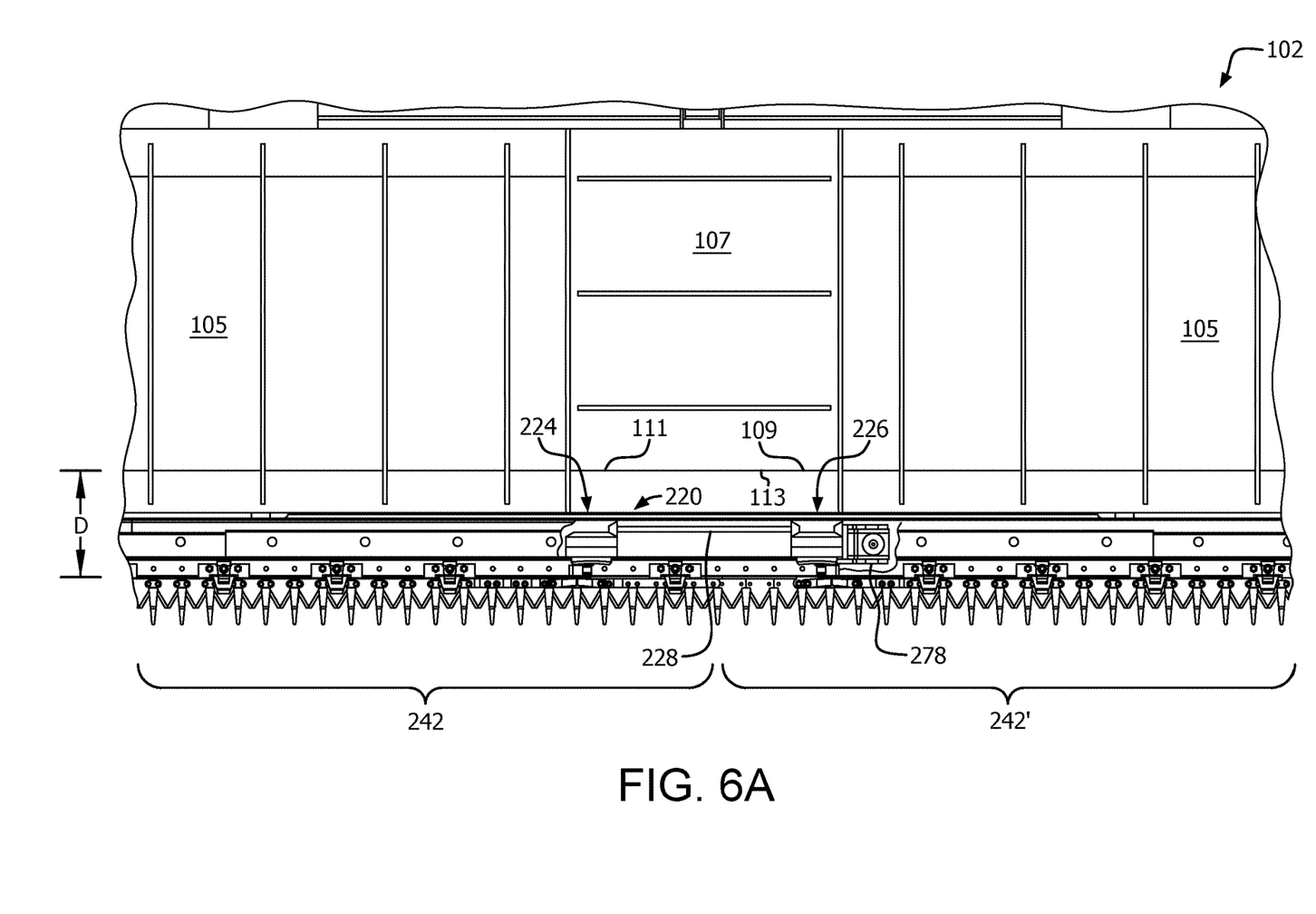
FIG. 6A is a partial top plan view of a portion of the header of FIG. 2 showing the interrelationship of the drive mechanism, the epicyclical drive gear train, the epicyclical driven gear train and the shaft extending between the epicyclical drive gear train and the epicyclical driven gear train.

FIG. 6A is similar to FIG. 6 except that the epicyclical driven gear train housing, the epicyclical drive gear train housing and the shaft housing are omitted to expose an exemplary connection of the epicyclical driven gear train, the epicyclical drive gear train and the shaft, as well as their spatial relation to the cutter bars and draper conveyors.

According to another aspect, the infeed conveyor forward end 113 is adjacent the epicyclical drive gear train 226, the epicyclical driven gear train 224, and the shaft 228. In particular, the infeed conveyor has lateral ends each adjacent one of the epicyclical drive gear train and the epicyclical driven gear train, whereby the epicyclical driven gear train 224 is positioned adjacent a forward first lateral end 109 of the infeed conveyor 107 and the epicyclical drive gear train 226 is positioned adjacent a forward second lateral end 111 of the infeed conveyor. The result is a construction having considerably less distance from the cutter bars to the forwardmost edges of the infeed draper conveyor(s). That is, the forwardmost edges of the infeed draper conveyor(s) 107 are moved forwardly such that they are spaced a distance "D", e.g., about 6 inches or less than about 10, 12, 14, 16, 18 or 20 inches, from the cutter bars. Consequently, minimal amounts of crop cut by the central portions of the cutter bars may fall between the cutter bars and the infeed draper conveyors and cut crop lifted and delivered by the infeed draper conveyors to the feederhouse is maximized.

According to the exemplary embodiments of the subject disclosure, the epicyclical driven gear train 224 and the epicyclical drive gear train 226 are directly connected to and move their respective cutter bars, e.g., without any intervening structure but for bearings or bushings 247, 247' which facilitate rotation of the first and second flange output shafts 240, 240'. In other words, the cutter bars directly engage the output shafts of the epicyclical driven gear train 224 and the epicyclical drive gear train 226. The result is a compact arrangement of parts which avoids the need for additional drive elements or other intervening structure to span a distance between the epicyclical driven gear train and the epicyclical drive gear train and the cutter bars. Consequently, moments or other forces that can lead to detrimental stresses in the epicyclical driven gear train and the epicyclical drive gear train are avoided or minimized. Additionally, the header assembly has less mass and is lighter in weight which is advantageous because the combine requires less energy to lift the header and there is less mass to float on the ground thereby reducing the likelihood of the cutter bars digging into the ground during operation. Moreover, the reduced depth of the epicyclical drive housing allows the infeed draper conveyor belt to be moved closer to the cutter bars than in conventional headers equipped with center knife drives which results in more efficient conveyance of cut crop to the feederhouse due to reduced loss of crop between the knife drive and the infeed conveyor.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

We claim:

1. A header for an agricultural harvester comprising:
   an epicyclical drive gear train operatively connected to a first cutter bar;
   an epicyclical driven gear train operatively connected to a second cutter bar;
   a shaft extending between and operatively connected to the epicyclical drive gear train and the epicyclical driven gear train;
   a frame; and
   an infeed conveyor supported by the frame, the infeed conveyor having a forward end adjacent the epicyclical drive gear train, the epicyclical driven gear train, and the shaft.

2. The header of claim 1, wherein the epicyclical drive gear train rotates in a first direction, and wherein the shaft is configured to rotate the epicyclical driven gear train in a second direction opposite the first direction.

3. The header of claim 1, wherein the epicyclical drive gear train rotates in a first direction, and wherein the shaft is configured to rotate the epicyclical driven gear train in the same direction as the first direction.

4. The header of claim 1, wherein the shaft engages a rear end of the epicyclical drive gear train and the epicyclical driven gear train.

5. The header of claim 1, wherein the shaft engages a medial side of the epicyclical drive gear train and the epicyclical driven gear train.

6. The header of claim 1, wherein the shaft includes a first end having a first bevel gear and a second end having a second bevel gear.

7. The header of claim 1, wherein the shaft extends substantially parallel to the forward end of the infeed conveyor.

8. The header of claim 1, further comprising a shaft housing covering the shaft.

9. The header of claim 8, wherein each of the epicyclical drive gear train and epicyclical driven gear train are housed within housings coextensive with the shaft housing.

10. The header of claim 1, wherein each of the epicyclical drive gear train and the epicyclical driven gear train rotate about an axis substantially transverse to a longitudinal axis of the first and second cutter bars.

11. The header of claim 1, wherein each of the epicyclical drive gear train and the epicyclical driven gear train includes an anteriorly facing output shaft for engagement with respective first and second cutter bars.

12. The header of claim 1, further comprising a drive mechanism driving rotation of the epicyclical drive gear train.

13. The header of claim 12, wherein the drive mechanism is a motor or a power drive shaft.

14. The header of claim 12, wherein the drive mechanism is positioned about a lateral side of the epicyclical drive gear train.

15. The header of claim 12, wherein the drive mechanism operatively engages a lateral side of the epicyclical drive gear train or a rear end of the epicyclical drive gear train.

16. The header of claim 1, wherein each of the epicyclical drive gear train and epicyclical driven gear train is housed within a housing.

17. The header of claim 1, wherein each of the epicyclical drive gear train and epicyclical driven gear train includes a bevel gear for operatively engaging the shaft.

18. The header of claim 1, wherein the infeed conveyor has lateral ends each adjacent one of the epicyclical drive gear train and the epicyclical driven gear train.

19. The header of claim 18, wherein the epicyclical drive gear train is adjacent a forward first lateral end of the infeed conveyor and the epicyclical driven gear train is adjacent a forward second lateral end of the infeed conveyor.

20. A header for an agricultural harvester comprising:
an epicyclical drive gear train operatively connected to a first cutter bar;
an epicyclical driven gear train operatively connected to a second cutter bar; and
a shaft extending between and operatively connected to the epicyclical drive gear train and the epicyclical driven gear train, the shaft including a first end having a first bevel gear and a second end having a second bevel gear.

21. The header of claim 20, wherein the epicyclical drive gear train rotates in a first direction, and wherein the shaft is configured to rotate the epicyclical driven gear train in a second direction opposite the first direction.

22. The header of claim 20, wherein the epicyclical drive gear train rotates in a first direction, and wherein the shaft is configured to rotate the epicyclical driven gear train in the same direction as the first direction.

23. The header of claim 20, wherein the shaft engages a rear end of the epicyclical drive gear train and the epicyclical driven gear train.

24. The header of claim 20, wherein the shaft engages a medial side of the epicyclical drive gear train and the epicyclical driven gear train.

25. The header of claim 20, further comprising:
a frame;
an infeed conveyor supported by the frame, the infeed conveyor having a forward end adjacent the epicyclical drive gear train, the epicyclical driven gear train, and the shaft.

26. A header for an agricultural harvester comprising:
an epicyclical drive gear train operatively connected to a first cutter bar;
an epicyclical driven gear train operatively connected to a second cutter bar;
a shaft extending between and operatively connected to the epicyclical drive gear train and the epicyclical driven gear train;
a frame; and
an infeed conveyor supported by the frame, the infeed conveyor having lateral ends each adjacent one of the epicyclical drive gear train and the epicyclical driven gear train.

27. The header of claim 26, wherein the epicyclical drive gear train rotates in a first direction, and wherein the shaft is configured to rotate the epicyclical driven gear train in a second direction opposite the first direction.

28. The header of claim 26, wherein the epicyclical drive gear train rotates in a first direction, and wherein the shaft is configured to rotate the epicyclical driven gear train in the same direction as the first direction.

29. The header of claim 26, wherein the shaft engages a rear end of the epicyclical drive gear train and the epicyclical driven gear train.

30. The header of claim 26, wherein the shaft engages a medial side of the epicyclical drive gear train and the epicyclical driven gear train.

31. The header of claim 26, wherein the shaft includes a first end having a first bevel gear and a second end having a second bevel gear.

* * * * *